(12) United States Patent
Tang

(10) Patent No.: US 11,570,800 B2
(45) Date of Patent: Jan. 31, 2023

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 27 days.

(21) Appl. No.: 17/062,448

(22) Filed: Oct. 2, 2020

(65) Prior Publication Data

US 2021/0022161 A1    Jan. 21, 2021

Related U.S. Application Data

(63) Continuation of application No. PCT/CN2018/081778, filed on Apr. 3, 2018.

(51) Int. Cl.
*H04W 72/12* (2009.01)
*H04L 1/00* (2006.01)
*H04L 5/00* (2006.01)

(52) U.S. Cl.
CPC ....... *H04W 72/1268* (2013.01); *H04L 1/0013* (2013.01); *H04L 1/0025* (2013.01);
(Continued)

(58) Field of Classification Search
CPC ......... H04W 72/1268; H04W 72/1289; H04W 72/0446; H04W 72/0453; H04L 1/0013;
(Continued)

(56) References Cited

U.S. PATENT DOCUMENTS

2007/0002743 A1    1/2007  Fan
2020/0068563 A1*   2/2020  Wu ................... H04B 7/0486
(Continued)

FOREIGN PATENT DOCUMENTS

CN    107046726 A    8/2017
CN    107046727 A    8/2017
(Continued)

OTHER PUBLICATIONS

Nokia, Nokia Shanghai Bell, 3GPP TSG RAN WG1 Meeting #92, R1-1802526; Potential solutions and techniques for NR unlicensed, Athens, Greece, Feb. 26-Mar. 2, 2018.
The EESR of corresponding European application No. 18913600.5, dated Feb. 19, 2021.
Eugene Chai et al:"LTE in unlicensed spectrum", Mobile Computing and Networking, ACM, 2 Penn Plaza, Suite 701 New York NY 10121-0701 USA, Oct. 3, 2016(Oct. 3, 2016), pp. 135-148, XP058279659.
(Continued)

*Primary Examiner* — Sharmin Chowdhury
(74) *Attorney, Agent, or Firm* — Ladas & Parry, LLP

(57) ABSTRACT

Provided in embodiments of the present application are a data transmission method, a terminal device and a network device, through which uplink data transmission can be performed when the channel detection bandwidth is inconsistent with the carrier bandwidth or the data transmission bandwidth of the system, thereby improving utilization efficiency for frequency spectrum resources of an unlicensed frequency spectrum. The method includes: receiving, by a terminal device, scheduling information transmitted by a network device; performing, by the terminal device, rate matching on the first transport block to obtain first data; determining, by the terminal device, an uplink transmission mode; and performing, by the terminal device, channel detection on the first carrier, and transmitting, according to a detection result and the uplink transmission mode, the first data to the network device through the first time-frequency resources.

20 Claims, 4 Drawing Sheets

(52) U.S. Cl.
CPC .......... *H04L 1/0039* (2013.01); *H04L 5/0007* (2013.01); *H04L 5/0044* (2013.01); *H04W 72/1289* (2013.01)

(58) Field of Classification Search
CPC ... H04L 1/0025; H04L 1/0039; H04L 5/0007; H04L 5/0044; H04L 5/0091
See application file for complete search history.

(56) References Cited

U.S. PATENT DOCUMENTS

2020/0374031 A1* 11/2020 Baldemair ............ H04L 5/0057
2021/0160901 A1* 5/2021 Takeda .................. H04L 5/0044

FOREIGN PATENT DOCUMENTS

| CN | 107231688 A | 10/2017 |
|----|-------------|---------|
| WO | 2016201632 A1 | 12/2016 |

OTHER PUBLICATIONS

Qualcomm Incorporated:"Multi-carrier LBT operation", 3GPP Draft; R1-153868 Multi-Carrier LBT Dperation, 3rd Generation Partnership PROJECT(3GPP), Mobile Competence Centre; 650, Route Des Lucioles; F-06921 Sophia-Antipolis Cedex; France, vol. RAN WG1, No. Beijing, China Aug. 24, 2015-Aug. 28, 2015 Aug. 23, 2015(Aug. 23, 2015), XP051001304.

International Search Report(ISR) dated Jan. 4, 2019 for Application No. PCT/CN2018/081//8, and its English translation provided by WIPO.

Written Opinion dated Jan. 4, 2019 for Application No. PCT/CN2018/081778, and its English translation provided by Google Translate.

The first Office Action of corresponding European application No. 18913600.5, dated Dec. 7, 2022.

* cited by examiner

200 Transmitting, by a network device, scheduling information to a terminal device, where the scheduling information is used to schedule the terminal device to transmit, through first time-frequency resources on a first carrier, a first transport block, where the first transport block is a transport block carried by a physical channel ~ S210

Receiving, by the network device, on the first time-frequency resources according to an uplink transmission mode, first data transmitted by the terminal device, where the first data is data after the first transport block undergoes rate-matching, the uplink transmission mode including: a first transmission mode and a second transmission mode, where the first transmission mode is that the first data is received through all or part of resources occupied by the first time-frequency resources on a frequency domain, and the second transmission mode is that the first data is received through all resources occupied by the first time-frequency resources on a frequency domain and is not received through part of resources occupied by the first time-frequency resources on a frequency domain ~ S220

FIG. 2

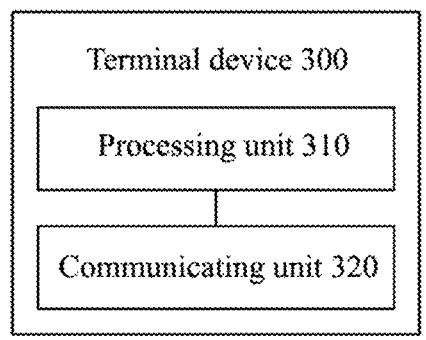

FIG. 3

DATA TRANSMISSION METHOD, TERMINAL DEVICE AND NETWORK DEVICE

CROSS-REFERENCE TO RELATED APPLICATIONS

This application is a continuation of International Application No. PCT/CN2018/081778 filed on Apr. 3, 2018, the content of which is incorporated herein by reference in its entirety.

TECHNICAL FIELD

Embodiments of the present application relate to the field of communication and, in particular, to a data transmission method, a terminal device and a network device.

BACKGROUND

In applying the New Radio (NR) technology to unlicensed carriers, since the carrier bandwidth supported by NR may be up to 400 MHz, there may be a case that the channel detection bandwidth is inconsistent with the carrier bandwidth/data transmission bandwidth. For example, there may be a case where the channel detection bandwidth is 20 MHz while the data transmission bandwidth through which the terminal device is scheduled is 40 MHz, and only a 20 MHz channel can be used in the 40 MHz bandwidth through which the terminal device is scheduled. In this case, how to perform uplink data transmission is a problem worth studying.

SUMMARY

Provided in embodiments of the present application are a data transmission method, a terminal device and a network device, through which uplink data transmission can be performed when the channel detection bandwidth is inconsistent with the carrier bandwidth or the data transmission bandwidth of the system, thereby reducing time delay of data transmission performed by the terminal device or improving resource utilization efficiency of a frequency spectrum.

In a first aspect, provided is a data transmission method, where the method includes:

receiving, by a terminal device, scheduling information transmitted by a network device, where the scheduling information is used to schedule the terminal device to transmit, through first time-frequency resources on a first carrier, a first transport block, where the first transport block is a transport block carried by a physical channel;

performing, by the terminal device, rate matching on the first transport block to obtain first data;

determining, by the terminal device, an uplink transmission mode, where the uplink transmission mode includes: a first transmission mode and a second transmission mode, where the first transmission mode is that the first data is transmitted through all or part of resources occupied by the first time-frequency resources on a frequency domain, and the second transmission mode is that the first data is transmitted through all resources occupied by the first time-frequency resources on a frequency domain and is not transmitted through part of resources occupied by the first time-frequency resources on a frequency domain; and performing, by the terminal device, channel detection on the first carrier, and transmitting, according to a detection result and the uplink transmission mode, the first data to the network device through the first time-frequency resources.

Therefore, in an embodiment of the present application, a terminal device performs rate matching on a first transport block to obtain first data, and determines an uplink transmission mode. Further, the terminal device transmits, according to the determined uplink transmission mode and a channel detection result for a first carrier, the first data to a network device through first time-frequency resources on the first carrier. As a result, when the channel detection bandwidth is inconsistent with the carrier bandwidth or the data transmission bandwidth of the system, uplink data transmission is performed through a first transmission mode or a second transmission mode, thus, time delay of data transmission performed by the terminal device may be reduced or utilization efficiency of carrier frequency spectrum resources may be improved.

Optionally, the first time-frequency resources may be resources on an unlicensed frequency spectrum.

Optionally, the physical channel may be a PUCCH, a PRACH, or a PUSCH.

Optionally, determining, by the terminal device, the uplink transmission mode according to a type of physical channel to be transmitted. For example, if it is a PUCCH, the terminal device determines that the uplink transmission mode is the second transmission mode.

Optionally, the performing, by the terminal device, rate matching on the first transport block to obtain first data may be that performing, by the terminal device, coding, modulation, and rate-matching on the first transport block to obtain the first data which matches a size of the first time-frequency resources.

In some possible implementations, the determining, by the terminal device, an uplink transmission mode includes:

receiving, by the terminal device, indication information transmitted by the network device, where the indication information is used to indicate the first transmission mode or the second transmission mode; and determining, by the terminal device, the uplink transmission mode according to the indication information.

Therefore, in an embodiment of the present application, the terminal device may determine the uplink transmission mode according to indication information transmitted by the network device, and thus may determine, based on the indication information transmitted by the network device, the uplink transmission mode during transmission of uplink data.

In some possible implementations, the indication information is one of: physical layer signaling, Radio Resource Control (RRC) signaling, and Media Access Control Control Element (MAC CE) signaling.

In some possible implementations, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the performing, by the terminal device, channel detection on the first carrier, and the transmitting, according to a detection result and the uplink transmission mode, the first data to the network device through the first time-frequency resources includes:

determining, by the terminal device, through the channel detection that the first sub-band is available, and transmitting the first sub-data to the network device through the resources occupied by the first time-frequency resources on the first sub-band; and/or determining, by the terminal device, through the channel detection that the second sub-band is available, and transmitting the second sub-data to the network device through the resources occupied by the first time-frequency resources on the second sub-band.

Optionally, the first sub-data is data in the first data mapped on the first sub-band, and the second sub-data is data in the first data mapped on the second sub-band.

Optionally, the first sub-data corresponds to a first modulation and coding scheme, and the second sub-data correspond to a second modulation and coding scheme. That is, a modulation and coding scheme corresponding to the data on the first sub-band and a modulation and coding scheme corresponding to the data on the second sub-band are independently determined.

Therefore, in an embodiment of the present application, the terminal device may use, on at least two sub-bands, modulation and coding schemes that can independently reflect signal-to-noise ratio status of the sub-bands, and thus it can improve efficiency of data transmission.

Therefore, in an embodiment of the present application, the uplink transmission mode is the first transmission mode, when the first sub-band is available, the terminal device transmits the first sub-data to the network device through the resources occupied by the first time-frequency resources on the first sub-band, and/or when the second sub-band is available, the terminal device transmits the second sub-data to the network device through the resources occupied by the first time-frequency resources on the second sub-band. Hence, the terminal device may transmit the first data through all or part of resources occupied by the first time-frequency resources on the frequency domain.

In some possible implementations, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the performing, by the terminal device, rate matching on the first transport block to obtain first data includes one of the following cases:

performing, by the terminal device, rate matching on the first transport block to obtain the first sub-data, and performing rate matching on the first transport block to obtain the second sub-data;

the first transport block includes two transport blocks, performing, by the terminal device, rate matching on one of the two transport blocks to obtain the first sub-data, and performing rate matching on other one of the two transport blocks to obtain the second sub-data; and the first transport block includes a first Code Block Group (CBG) and a second CBG, performing, by the terminal device, rate matching on the first CBG to obtain the first sub-data, and performing rate matching on the second CBG to obtain the second sub-data.

Therefore, in an embodiment of the present application, data mapped on the first sub-band and the second sub-band may be independently decoded and fed back, and thus it can improve a probability of channel access and reduce time delay of data transmission.

In some possible implementations, the uplink transmission mode is the second transmission mode, the performing, by the terminal device, channel detection on the first carrier, and the transmitting, according to a detection result and the uplink transmission mode, the first data to the network device through the first time-frequency resources includes:

determining, by the terminal device, through the channel detection that all resources in the first time-frequency resources are available, and transmitting the first data to the network device through the first time-frequency resource; or determining, by the terminal device, through the channel detection that at least part of resources in the first time-frequency resources are unavailable, and not transmitting, by the terminal device, the first data to the network device through the first time-frequency resources.

Therefore, in an embodiment of the present application, the uplink transmission mode is the second transmission mode, when all resources in the first time-frequency resources are available, the terminal device transmits the first sub-data to the network device through the first time-frequency resources, and/or when at least part of resources in the first time-frequency resources are unavailable, the terminal device does not transmit the second sub-data to the network device through the first time-frequency resources. Hence, the terminal device may transmit the first data through all resources occupied by the first time-frequency resources on a frequency domain, and does not transmit the first data through part of resources occupied by the first time-frequency resources on a frequency domain.

In some possible implementations, the performing, by the terminal device, rate matching on the first transport block includes:

performing, by the terminal device, rate matching on the first transport block according to a modulation order corresponding to a Modulation and Coding Scheme (MCS) index, where when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

Therefore, in an embodiment of the present application, when the uplink transmission mode is the first transmission mode, the terminal device may determine a modulation order according to an MCS index and a first MCS configuration set, and when the uplink transmission mode is the second transmission mode, the terminal device may determine a modulation order according to an MCS index and a second MCS configuration set, hence, two different transmission modes may correspond to different MCS configuration sets.

In some possible implementations, the first MCS configuration set being different from the second MCS configuration set includes:

a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

In some possible implementations, the uplink transmission mode is the first transmission mode, where the first transport block includes at least one of Ultra-Reliable and Low Latency Communication (URLLC) data and Uplink Control Information (UCI) therein.

Therefore, in an embodiment of the present application, when the uplink transmission mode is the first transmission mode, data with higher priority may be transmitted.

In some possible implementations, the scheduling information is one of Downlink Control Information (DCI), RRC signaling, and MAC CE signaling.

In a second aspect, provided is a data transmission method, where the method includes:

transmitting, by a network device, scheduling information to a terminal device, where the scheduling information is used to schedule the terminal device to transmit, through first time-frequency resources on a first carrier, a first transport block, wherein the first transport block is a transport block carried by a physical channel; and receiving, by the network device, on the first time-frequency resources according to an uplink transmission mode, first data transmitted by the terminal device, where the first data is data after the first transport block undergoes rate-matching, the uplink transmission mode including: a first transmission mode and a second transmission mode, where the first transmission mode is that the first data is received through all or part of resources occupied by the first time-frequency resources on a frequency domain, and the second transmission mode is that the first data is received through all resources occupied by the first time-frequency resources on a frequency domain and is not received through part of resources occupied by the first time-frequency resources on a frequency domain.

Therefore, in an embodiment of the present application, the network device receives, on the first time-frequency resources according to an uplink transmission mode, first data transmitted by the terminal device Further, the network device receives the first data through all or part of resources occupied by the first time-frequency resources on a frequency domain, alternatively, the network device receives the first data through all resources occupied by the first time-frequency resources on a frequency domain and does not receive the first data through part of resources occupied by the first time-frequency resources on a frequency domain. As a result, when the channel detection bandwidth is inconsistent with the carrier bandwidth or the data transmission bandwidth of the system, uplink data transmission is performed through a first transmission mode or a second transmission mode, thereby improving utilization efficiency for frequency spectrum resources of an unlicensed frequency spectrum.

Optionally, the first time-frequency resources may be resources on an unlicensed frequency spectrum.

Optionally, the physical channel may be a PUCCH, a PRACH, or a PUSCH.

Optionally, the network device determines the uplink transmission mode according to a type of physical channel to be received. For example, if it is a PUCCH, the network device determines that the uplink transmission mode is the second transmission mode.

Optionally, the first data is data which is obtained by the terminal device by performing coding, modulation, and rate-matching on the first transport block, and which matches a size of the first time-frequency resources.

In some possible implementations, before the receiving, by the network device, on the first time-frequency resources according to the uplink transmission mode, the first data transmitted by the terminal device, the method further includes:

transmitting, by the network device, indication information to the terminal device, where the indication information is used to indicate the first transmission mode or the second transmission mode;

the receiving, by the network device, on the first time-frequency resources according to an uplink transmission mode, first data transmitted by the terminal device includes:

when the indication information indicates the first transmission mode, receiving, by the network device, on the first time-frequency resources according to the first transmission mode, the first data transmitted by the terminal device; or when the indication information indicates the second transmission mode, receiving, by the network device, on the first time-frequency resources according to the second transmission mode, the first data transmitted by the terminal device.

In some possible implementations, the indication information is one of: physical layer signaling, RRC signaling, and MAC CE signaling.

In some possible implementations, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the receiving, by the network device, on the first time-frequency resources according to an uplink transmission mode, first data transmitted by the terminal device includes:

receiving, by the network device, on resources occupied by the first time-frequency resources on the first sub-band, the first sub-data, and receiving, on resources occupied by the first time-frequency resources on the second sub-band, the second sub-data.

In some possible implementations, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the first data being data after the first transport block undergoes rate-matching includes one of the following cases:

the first sub-data is data after the first transport block undergoes rate-matching, and the second sub-data is data after the first transport block undergoes rate-matching;

the first transport block includes two transport blocks, the first sub-data being data after one of the two transport blocks undergoes rate-matching, and the second sub-data being data after other one of the two transport blocks undergoes rate-matching; and the first transport block includes a first CBG and a second CBG, the first sub-data being data after the first CBG undergoes rate-matching, and the second sub-data being data after the second CBG undergoes rate-matching.

In some possible implementations, the first data being data after the first transport block undergoes rate-matching includes:

the first data is data after the first transport block undergoes rate-matching by the terminal device according to a modulation order corresponding to an MCS index, where when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

In some possible implementations, the first MCS configuration set being different from the second MCS configuration set includes:

a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

In some possible implementations, the uplink transmission mode is the first transmission mode, where the first transport block includes at least one of URLLC data and UCI therein.

In some possible implementations, the scheduling information is one of DCI, RRC signaling, and MAC CE signaling.

In some possible implementations, the method further includes:

demodulating, by the network device, the first time-frequency resources, and transmitting feedback information to the terminal device according to a demodulation result, where the feedback information indicates whether data transmitted on the first time-frequency resources is successfully received; or demodulating, by the network device, the first time-frequency resources, and determining, according to a demodulation result, whether to transmit retransmission data corresponding to the first transport block to the terminal device.

Optionally, the feedback information is at least one of ACK, NACK, DTX, and measurement information, where the measurement information includes at least one of CSI on the first carrier, CSI-RS resource identifier on the first carrier, and layer information about the strongest signal on the first carrier.

In a third aspect, provided is a terminal device for implementing the method in the first aspect described above or any possible implementation of the first aspect. Specifically, the terminal device includes units for implementing the method in the first aspect described above or any possible implementation of the first aspect.

In a fourth aspect, provided is a device for transmitting uplink data. The device includes: a memory, a processor, an input interface, and an output interface. Among them, the memory, the processor, the input interface and the output interface are connected through a bus system. The memory is configured to store instructions, and the processor is configured to execute the instructions stored in the memory, for implementing the method in the first aspect described above or any possible implementation of the first aspect.

In a fifth aspect, provided is a network device for implementing the method in the second aspect described above or any possible implementation of the second aspect. Specifically, the network device includes units for implementing the method in the second aspect described above or any possible implementation of the second aspect.

In a sixth aspect, provided is a device for transmitting uplink data. The device includes: a memory, a processor, an input interface, and an output interface. Among them, the memory, the processor, the input interface and the output interface are connected through a bus system. The memory is configured to store instructions, and the processor is configured to execute the instructions stored in the memory, for implementing the method in the second aspect described above or any possible implementation of the second aspect.

In a seventh aspect, provided is a computer storage medium for storing computer software instructions used for implementing the method in the first aspect described above or any possible implementation of the first aspect, which contains a program designed for performing the above aspects.

In an eighth aspect, provided is a computer program product including instructions which, when executed on a computer, cause the computer to implement the method in the first aspect described above or any optional implementation of the first aspect.

In a ninth aspect, provided is a computer storage medium for storing computer software instructions used for implementing the method in the second aspect described above or any possible implementation of the second aspect, which contains a program designed for performing the above aspects.

In a tenth aspect, provided is a computer program product including instructions which, when executed on a computer, cause the computer to implement the method in the second aspect described above or any optional implementation of the second aspect.

BRIEF DESCRIPTION OF DRAWINGS

FIG. 2 is a schematic flowchart of a data transmission method according to another embodiment of the present application.

FIG. 3 is a schematic block diagram of a terminal device according to an embodiment of the present application.

DESCRIPTION OF EMBODIMENTS

Figure 1:
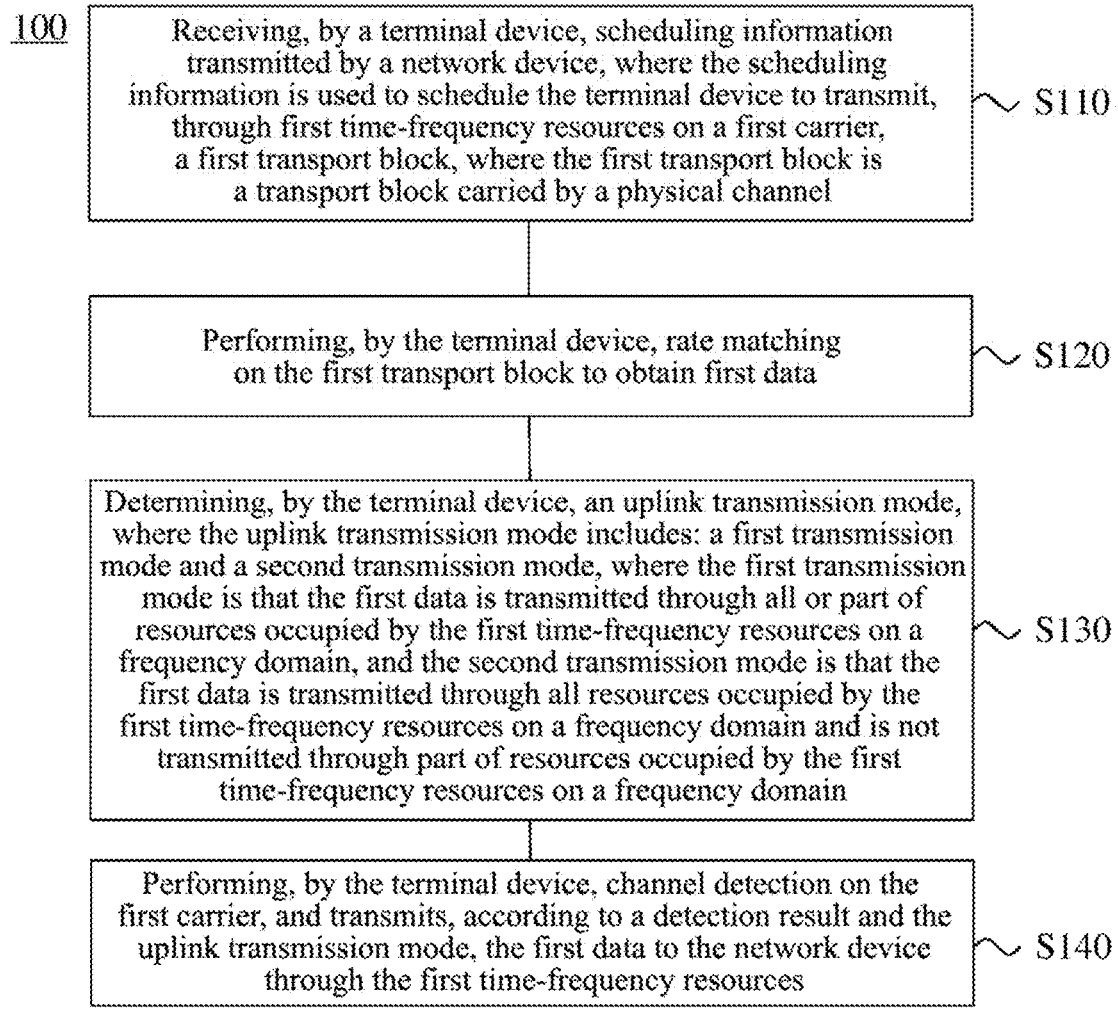
FIG. 1 is a schematic flowchart of a data transmission method according to an embodiment of the present application.

Technical solutions in the present application will be described hereunder in conjunction with the accompanying drawings in the embodiments of the present application.

The embodiments of the present application may be applied to various communication systems, such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolutional system of the NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication system, or other communication systems, etc.

In general, traditional communication systems support a limited number of connections and are also easy to implement. However, with development of communication technologies, mobile communication systems will not only support traditional communication, but also support, For example, Device to Device (D2D) communication, Machine to Machine (M2M) communication, Machine Type Communication (MTC), and Vehicle to Vehicle (V2V) communication, etc., and embodiments of the present application can also be applied to these communication systems.

Optionally, the communication system in the embodiments of the present application may be applied to a Carrier Aggregation (CA) scenario, a Dual Connectivity (DC) scenario, and may also be applied to a Standalone (SA) network-distribution scenario.

The applied frequency spectrum is not limited in the embodiments of the present application. For example, the embodiments of the present application can be applied to a licensed frequency spectrum, and can also be applied to an unlicensed frequency spectrum.

Various embodiments are described in the embodiments of the present application with reference to a network device and a terminal device, where the terminal device may also be termed as User Equipment (UE), an access terminal, a subscriber unit, a subscriber station, a mobile station, a mobile platform, a remote station, a remote terminal, a mobile device, a user terminal, a terminal, a wireless communication device, a user agent or a user device, etc. The terminal device may be an STATION (STA) in a WLAN, and may be a cellular phone, a cordless phone, a Session Initiation Protocol (SIP) phone, a Wireless Local Loop (WLL) station, a Personal Digital Assistant (PDA) device, a handheld device with wireless communication functions, a computing device or other processing devices connected to a wireless modem, an in-vehicle device, a wearable device, and a terminal device in a next generation communication network such as an NR network, or a terminal device in a future evolved Public Land Mobile Network (PLMN) network, etc.

By way of example but not limitation, in the embodiments of the present application, the terminal device may also be a wearable device. The wearable device can also be termed as a wearable smart device, which is a general term for devices that are wearable and that are developed with intelligent design to daily wear by applying wearable technologies, such as glasses, gloves, watches, clothes and shoes, etc. The wearable device is a portable device that is worn directly on the body or integrated into a user's clothes or accessories. The wearable device is not only a hardware device, but also implements powerful functions through software support, data interaction, and cloud interaction. A generalized wearable smart device includes that being full-featured, large-sized, implementing complete or partial functions independently of smartphones, such as a smart watch or smart glasses, etc, and that only focusing on a certain type of application functions and needing to use in conjunction with other devices (e.g., smartphones), such as various smart bracelets and smart jewelries for sign monitoring.

The network device may be a device used to communicate with the mobile device. The network device may be an Access Point (AP) in the WLAN, a Base Transceiver Station (BTS) in the GSM or the CDMA, a NodeB (NB) in the WCDMA, and may also be an Evolutional Node B (eNB or eNodeB), or a relay station or an access point, or a vehicle-mounted device, a wearable device in the LTE, and a network device (gNB) in the NR network or a network device in the future evolved PLMN network, etc.

In the embodiments of the present application, the network device provides a cell with a service, and the terminal device communicates with the network device through transmission resources (Such as, frequency domain resources, or, in other words, frequency spectrum resources) used by the cell. The cell may be a cell corresponding to the network device (such as, a base station). The cell may belong to a macro base station, and may also belong to a base station corresponding to a Small cell. The Small cell herein may include: a Metro cell, a Micro cell, a Pico cell, a Femto cell, etc. These Small cells have characteristics of small coverage and low transmitting power, which are suitable for providing a data transmission service with high-speed.

In the embodiments of the present application, the physical channel includes a downlink physical channel and an uplink physical channel. Optionally, the downlink physical channel may include a Physical Downlink Control Channel (PDCCH), an Enhanced Physical Downlink Control Channel (EPDCCH), a Physical Downlink Shared Channel (PDSCH), a Physical HARQ Indicator Channel (Physical Hybrid ARQ Indicator Channel, PHICH), a Physical Multicast Channel (PMCH), and a Physical Broadcast Channel (PBCH), etc. A downlink reference signal may include a downlink Synchronization Signal, a Phase Tracking Reference Signal (PT-RS), a downlink DeModulation Reference Signal (DMRS), and a Channel State Information-Reference Signal (CSI-RS), etc., where the downlink Synchronization Signal can be used for a communication device to access a network and management and measurement of radio resources, the downlink DIVERS can be used for downlink channel demodulation, the CSI-RS can be used for downlink channel measurement and downlink time-frequency synchronization or phase tracking, and the PT-RS can also be used for downlink channel measurement, downlink time-frequency synchronization or phase tracking. It should be understood that the embodiments of the present application may include therein a downlink physical channel or a downlink reference signal with the same name and different functions as described above, or may include a downlink physical channel or a downlink reference signal with different names and the same functions as described above, and this is not limited in the present application.

Optionally, the uplink physical channel in the embodiments of the present application may include a Physical Random Access Channel (PRACH), a Physical Uplink Control Channel (PUCCH), and a Physical Uplink Shared Channel (PUSCH), etc. The uplink reference signal may include an uplink DMRS, a Sounding Reference Signal (SRS), and a PT-RS, etc. Among them, the uplink DMRS can be used for uplink channel demodulation, the SRS can be used for uplink channel measurement, uplink time-frequency synchronization or phase tracking, and the PT-RS can also be used for uplink channel measurement, uplink time-frequency synchronization or phase tracking. It should be understood that the embodiments of the present application may include therein an uplink physical channel or an uplink reference signal with the same name and different functions as described above, or may include an uplink physical channel or an uplink reference signal with different names and the same functions as described above, and this is not limited in the present application.

The data transmission method in the embodiments of the present application will be described hereunder with reference to FIG. 1 to FIG. 2. It should be understood that FIG. 1 to FIG. 2 are schematic flowcharts of the data transmission method in the embodiments of the present application, illustrating detailed communication steps or operations of the method, but these steps or operations are only examples, and other operations or variations of various operations in FIG. 1 to FIG. 2 may also be performed in the embodiments of the present application, that is, execution orders of the steps in FIG. 1 to FIG. 2 are not limited in the embodiments of the present application.

In addition, the steps in FIG. 1 to FIG. 2 may be performed in orders other than that shown in FIG. 1 to FIG. 2, and it may not be necessary to perform all operations in FIG. 1 to FIG. 2.

When the channel detection bandwidth is inconsistent with the data transmission bandwidth, For example, the channel detection bandwidth is 20 MHz while the data transmission bandwidth is 40 MHz, and it is possible that only 20 MHz of the 40 MHz can be used. In this case, if use of resources of the 20 MHz are not allowed for data transmission, then time delay of data transmission will be increased; if use of resources of the 20 MHz are always allowed for data transmission, in order to render a certain probability of successful transmission for data transmission during use of part of bandwidth resources, a more conservative scheduling method needs to be used, thereby reducing utilization efficiency for frequency spectrum resources of an unlicensed frequency spectrum. Therefore, two data transmission modes are proposed in the embodiments of the present application, and for the system, the data transmission modes can be flexibly configured according to service time delay requirements, reliability requirements, etc., and thus frequency spectrum resources are more effectively used.

It should be understood that the data transmission method in the embodiments of the present application may be used for the uplink physical channel or the downlink physical channel. For ease of description, the uplink physical channel transmission is used as an example for description, and a downlink physical channel transmission process will not be described in detail.

FIG. 1 is a schematic flowchart of a data transmission method 100 according to an embodiment of the present application. As shown in FIG. 1, the method 100 may include the following content:

S110, receiving, by a terminal device, scheduling information transmitted by a network device, where the scheduling information is used to schedule the terminal device to transmit, through first time-frequency resources on a first carrier, a first transport block, wherein the first transport block is a transport block carried by a physical channel.

S120, performing, by the terminal device, rate matching on the first transport block to obtain first data.

S130, determining, by the terminal device, an uplink transmission mode, where the uplink transmission mode includes: a first transmission mode and a second transmission mode, where the first transmission mode is that the first data is transmitted through all or part of resources occupied by the first time-frequency resources on a frequency domain, and the second transmission mode is that the first data is transmitted through all resources occupied by the first time-frequency resources on a frequency domain, and is not transmitted through part of resources occupied by the first time-frequency resources on a frequency domain.

S140, performing, by the terminal device, channel detection on the first carrier, and transmitting, according to a detection result and the uplink transmission mode, the first data to the network device through the first time-frequency resources.

Optionally, the first time-frequency resources may be resources on an unlicensed frequency spectrum.

Optionally, the physical channel may be a PUCCH, a PRACH, or a PUSCH.

Optionally, the performing, by the terminal device rate matching on the first transport block to obtain first data may be that performing, by the terminal device coding, modulation, and rate-matching on the first transport block to obtain the first data which matches a size of the first time-frequency resources.

Optionally, the terminal device may perform rate matching on the first transport block during coding and modulation of the first transport block to obtain the first data.

Optionally, the terminal device may perform channel detection on the first carrier according to a "Listen Before Talk (LBT)" principle. That is, a communication device (the terminal device) needs to perform channel detection before performing signal transmission on a channel of an unlicensed frequency spectrum, and the communication device can perform signal transmission only when a channel listening result shows that the channel is idle; the communication device cannot perform signal transmission if a channel detection result of the communication device on a channel of an unlicensed frequency spectrum shows that the channel is busy.

Optionally, in the embodiment of the present application, the scheduling information is one of DCI, RRC signaling, and MAC CE signaling.

It should be noted that, in the embodiment of the present application, the scheduling information may also be used to schedule the terminal device to transmit, through the first time-frequency resources on the first carrier, signals in uplink channels such as a PUCCH, a PRACH, and a PUSCH, etc.

Optionally, in the embodiment of the present application, the terminal device may determine the uplink transmission mode according to a type of physical channel to be transmitted. For example, when the physical channel is a PUSCH (in other words, when the first transport block is a transport block carried by a PUSCH channel), the terminal device may determine that the uplink transmission mode is the first transmission mode.

For another example, when the physical channel is a PUCCH or a PRACH (in other words, when the first transport block is an information block carried by a PUCCH channel or the first transport block corresponds to a preamble sequence carried by a PRACH channel), the terminal device may determine that the uplink transmission mode is the second transmission mode.

Certainly, there also may be a case that when the physical channel is a PUSCH, the terminal device determines that the uplink transmission mode is the second transmission mode. Alternatively, when the physical channel is a PUCCH or a PRACH, the terminal device determines that the uplink transmission mode is the first transmission mode.

It should be noted that when the physical channel is a PRACH, the scheduling information may be used to schedule the terminal device to transmit, through the first time-frequency resources on the first carrier, a first sequence (such as, a preamble sequence) instead of the first transport block.

Optionally, in the embodiment of the present application, the terminal device may determine the uplink transmission mode according to indication information transmitted by the network device. For example, the terminal device receives indication information transmitted by the network device, where the indication information is used to indicate the first transmission mode or the second transmission mode; the terminal device determines the uplink transmission mode according to the indication information. Therefore, the terminal device may determine, according to the indication information transmitted by the network device, the uplink transmission mode, and thus may determine, based on the indication information transmitted by the network device, the uplink transmission mode during transmission of uplink data.

Optionally, the indication information is one of: physical layer signaling, RRC signaling, and MAC CE signaling.

Optionally, the network device may determine the uplink transmission mode of the terminal device according to priority of the first transport block transmitted by scheduling the terminal device, for example, when the data requested by the terminal device for transmission is high-priority data (such as URLLC data), the network device instructs the terminal device to perform data transmission according to the first transmission mode, otherwise, the network device instructs the terminal device to perform data transmission according to the second transmission mode.

For example, the priority of the first transport block may be represented by ProSe Per-Packet Priority (PPPP).

Optionally, in the embodiment of the present application, the uplink transmission mode is the first transmission mode, where the first transport block includes at least one of URLLC data and UCI therein. Hence, reliable transmission of the URLLC data, the UCI, etc., can be ensured.

Optionally, as an embodiment, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data.

Specifically, determining, by the terminal device, through the channel detection that the first sub-band is available, and transmitting the first sub-data to the network device through the resources occupied by the first time-frequency resources on the first sub-band; and/or determining, by the terminal device, through the channel detection that the second sub-band is available, and transmitting the second sub-data to the network device through the resources occupied by the first time-frequency resources on the second sub-band.

It should be noted that the first time-frequency resources occupy part of or all resources in the at least two sub-bands.

Optionally, a bandwidth of the first sub-band and/or the second sub-band may be an integer multiple of 20 MHz, and the bandwidth of the first sub-band and the bandwidth of the second sub-band may be the same or different. For example, the bandwidth of the first sub-band is 20 MHz, and the bandwidth of the second sub-band is 40 MHz.

Optionally, the bandwidth of the first sub-band and/or the second sub-band is consistent with the channel detection bandwidth in terms of size.

Optionally, the resources occupied by the first time-frequency resources on the first sub-band and the resources occupied by the first time-frequency resources on the second sub-band may be the same or different in terms of size.

It should be noted, the first sub-data is data in the first data mapped on the first sub-band, and the second sub-data is data in the first data mapped on the second sub-band.

For example, the terminal device performs channel detection on the first sub-band and the second sub-band, if both the first sub-band and the second sub-band are available, the terminal device transmits the first sub-data to the network device through the resources occupied by the first time-frequency resources on the first sub-band, and transmits the second sub-data to the network device through the resources occupied by the first time-frequency resources on the second sub-band; or if the first sub-band is available and the second sub-band is unavailable, the terminal device transmits the first sub-data to the network device through the resources occupied by the first time-frequency resources on the first sub-band, and drops transmitting the second sub-data on the resources occupied by the first time-frequency resources on the second sub-band; or if the first sub-band is unavailable and the second sub-band is available, the terminal device drops transmitting the first sub-data on the resources occupied by the first time-frequency resources on the first sub-band, and transmits the second sub-data to the network device through the resources occupied by the first time-frequency resources on the second sub-band; or if the first sub-band and the second sub-band are unavailable, the terminal device drops transmitting the first sub-data on the resources occupied by the first time-frequency resources on the first sub-band, and drops transmitting the second sub-data on the resources occupied by the first time-frequency resources on the second sub-band.

Optionally, the first sub-data corresponds to a first modulation and coding scheme, and the second sub-data corresponds to a second modulation and coding scheme. That is, a modulation and coding scheme corresponding to the data on the first sub-band and a modulation and coding scheme corresponding to the data on the second sub-band are independently determined.

It should be understood that the Modulation and Coding Scheme (MCS) can be used to determine a modulation order (e.g., Quadrature Phase Shift Keying (QPSK), 16 Quadrature Amplitude Modulation, (16QAM), 64QAM, 256QAM, 1024QAM, etc.) and/or a code rate.

Optionally, modulation orders and/or code rates corresponding to the first sub-data and the second sub-data are independently determined. Further optionally, the first modulation and coding scheme is determined according to status of a signal-to-noise ratio on the first sub-band, and the second modulation and coding scheme is determined according to status of a signal-to-noise ratio on the second sub-band. The first modulation and coding scheme and the second modulation and coding scheme may be the same or different. Therefore, the terminal device may use, on at least two sub-bands, modulation and coding schemes that can independently reflect signal-to-noise ratio status of the sub-bands, and thus it can improve efficiency of data transmission.

Optionally, in the embodiment of the present application, the performing, by the terminal device, rate matching on the first transport block to obtain first data, including one of the following cases:

performing, by the terminal device, rate matching on the first transport block to obtain the first sub-data, and performing rate matching on the first transport block to obtain the second sub-data;

the first transport block includes two transport blocks, performing, by the terminal device, rate matching on one of the two transport blocks to obtain the first sub-data, and performing rate matching on other one of the two transport blocks to obtain the second sub-data; and the first transport block includes a first CBG and a second CBG, performing, by the terminal device, rate matching on the first CBG to obtain the first sub-data, and performing rate matching on the second CBG to obtain the second sub-data.

For example, when the terminal device performs rate matching on the first transport block to obtain the first sub-data and performs rate matching on the first transport block to obtain the second sub-data, the rate matching mode or the redundant version corresponding to the first sub-data may be different from the rate matching mode or the redundant version corresponding to the second sub-data. Therefore, the first sub-data and the second sub-data may be different, but the first sub-data and the second sub-data correspond to the same transport block. That is to say, the terminal device performs repeat transmission on the first transport block on the first sub-band and the second sub-band.

For another example, the first transport block includes Transport Block A (TB A) and TB B, where the first sub-data is data obtained by performing rate matching on TB A, and the second sub-data is data obtained by performing rate matching on TB B, hence, data mapped on the first sub-band and the second sub-band are ensured to be independently decoded and fed back.

It should be understood that the first CBG includes an integer number of CBGs, and the second CBG includes an integer number of CBGs.

It should be noted that, if the first transport block belongs to one transport block corresponding to one codeword, for example, TB1, the first CBG may include an integer number of CBGs in TB1, and the second CBG may also include an integer number of CBGs in TB1.

Optionally, there is no intersection between the CBGs in the first CBG and the CBGs in the second CBG.

If the first transport block belongs to two transport blocks corresponding to two codewords, for example, TB1 and TB2, at this point, the CBGs included in the first CBG and the second CBG may satisfy the following manners:

Manner 1: the first CBG and the second CBG may include an integer number of CBGs in TB1.

Manner 2: the first CBG and the second CBG may include an integer number of CBGs in TB2.

Manner 3: the first CBG may include an integer number of CBGs in TB1, while the second CBG may include an integer number of CBGs in TB2;

Manner 4: the first CBG may include an integer number of CBGs in TB2, while the second CBG may include an integer number of CBGs in TB1;

Manner 5: the first CBG may include m CBGs in TB1 and n CBGs in TB2, while the second CBG may include x CBGs in TB1 and y CBGs in TB2, and m, n, x, and y are positive integers.

Optionally, in the above manners, there is no intersection between the CBGs in the first CBG and the CBGs in the second CBG.

Optionally, as an embodiment, the uplink transmission mode is the second transmission mode.

Specifically, determining, by the terminal device, through the channel detection that all resources in the first time-frequency resources are available, and transmitting the first data to the network device through the first time-frequency resource; or determining, by the terminal device, through the channel detection that at least part of resources in the first time-frequency resources are unavailable, and not transmitting, by the terminal device, the first data to the network device through the first time-frequency resources.

Therefore, in the embodiment of the present application, the uplink transmission mode is the second transmission mode, when all resources in the first time-frequency resources are available, the terminal device transmits the first sub-data to the network device through the first time-frequency resources, and/or when at least part of resources in the first time-frequency resources are unavailable, the terminal device does not transmit the second sub-data to the network device through the first time-frequency resources. Hence, the terminal device may transmit the first data through all resources occupied by the first time-frequency resources on a frequency domain, and does not transmit the first data through part of resources occupied by the first time-frequency resources on a frequency domain.

Optionally, in the embodiment of the present application, the terminal device may perform rate matching on the first transport block according to a modulation order corresponding to an MCS index, where when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

Optionally, a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

It should be understood that one MCS configuration set includes therein at least an MCS index and a modulation order corresponding to the MCS index. Optionally, the MCS set also includes therein a target code rate corresponding to an MCS index. Table 1 gives an example of the first MCS configuration set and the second MCS configuration set.

Optionally, for the same MCS index, a corresponding modulation order for the MCS index in the first MCS configuration set is greater than or equal to a corresponding modulation order for the MCS index in the second MCS configuration set. As shown in Table 1, for example, assuming that the MCS index is 10, for the MCS index of 10, a corresponding modulation order in the first MCS configuration set is 6, and a corresponding modulation order in the second MCS configuration set is 4.

Optionally, for the same MCS index, a corresponding target code rate for the MCS index in the first MCS configuration set is less than or equal to a corresponding target code rate for the MCS index in the second MCS configuration set. As shown in Table 1, for example, assuming that the MCS index is 10, for the MCS index of 10, a corresponding target code rate in the first MCS configuration set is 226/1024=0.2207, and a corresponding target code rate in the second MCS configuration set is 340/1024=0.3320.

TABLE 1

MCS Configuration Set

| MCS index | First MCS configuration set | | Second MCS configuration set | |
|---|---|---|---|---|
| | Modulation order | Target code rate x [1024] | Modulation order | Target code rate x [1024] |
| 0 | 2 | 120 | 2 | 120 |
| 1 | 2 | 157 | 2 | 157 |
| 2 | 2 | 193 | 2 | 193 |
| 3 | 2 | 251 | 2 | 251 |
| 4 | 2 | 308 | 2 | 308 |
| 5 | 4 | 190 | 2 | 379 |
| 6 | 4 | 224 | 2 | 449 |
| 7 | 4 | 263 | 2 | 526 |
| 8 | 4 | 301 | 2 | 602 |
| 9 | 4 | 340 | 2 | 679 |
| 10 | 6 | 226 | 4 | 340 |
| 11 | 6 | 252 | 4 | 378 |
| 12 | 6 | 289 | 4 | 434 |
| 13 | 6 | 326 | 4 | 490 |
| 14 | 6 | 368 | 4 | 553 |
| 15 | 6 | 410 | 4 | 616 |
| 16 | 6 | 438 | 4 | 658 |
| 17 | 6 | 438 | 6 | 438 |
| 18 | 6 | 466 | 6 | 466 |
| 19 | 6 | 517 | 6 | 517 |
| 20 | 6 | 567 | 6 | 567 |
| 21 | 6 | 616 | 6 | 616 |
| 22 | 6 | 666 | 6 | 666 |
| 23 | 6 | 719 | 6 | 719 |
| 24 | 6 | 772 | 6 | 772 |
| 25 | 6 | 822 | 6 | 822 |
| 26 | 6 | 873 | 6 | 873 |
| 27 | 6 | 910 | 6 | 910 |
| 28 | 6 | 948 | 6 | 948 |
| 29 | 2 | Reserved | 2 | Reserved |
| 30 | 4 | Reserved | 4 | Reserved |
| 31 | 6 | Reserved | 6 | Reserved |

Therefore, in the embodiment of the present application, a terminal device performs rate matching on a first transport block to obtain first data, and determines an uplink transmission mode, further, the terminal device transmits, according to the determined uplink transmission mode and a channel detection result for a first carrier, the first data to a network device through first time-frequency resources on the first carrier. As a result, when the channel detection bandwidth is inconsistent with the carrier bandwidth or the data transmission bandwidth of the system, uplink data transmission is performed through a first transmission mode or a second transmission mode, thereby improving utilization efficiency for frequency spectrum resources of an unlicensed frequency spectrum.

FIG. 2 is a schematic flowchart of a data transmission method 200 according to another embodiment of the present application. As shown in FIG. 2, the method 200 includes the following contents:

S210, transmitting, by a network device, scheduling information to a terminal device, where the scheduling information is used to schedule the terminal device to transmit, through first time-frequency resources on a first carrier, a first transport block, wherein the first transport block is a transport block carried by a physical channel.

S220, receiving, by the network device, on the first time-frequency resources according to an uplink transmission mode, first data transmitted by the terminal device, where the first data is data after the first transport block undergoes rate-matching, the uplink transmission mode including: a first transmission mode and a second transmission mode, where the first transmission mode is that the first data is received through all or part of resources occupied by the first time-frequency resources on a frequency domain, and the second transmission mode is that the first data is received through all resources occupied by the first time-frequency resources on a frequency domain and is not received through part of resources occupied by the first time-frequency resources on a frequency domain.

Therefore, in an embodiment of the present application, the network device receives, on the first time-frequency resources according to an uplink transmission mode, first data transmitted by the terminal device Further, the network device receives the first data through all or part of resources occupied by the first time-frequency resources on a frequency domain, alternatively, the network device receives the first data through all resources occupied by the first time-frequency resources on a frequency domain and does not receive the first data through part of resources occupied by the first time-frequency resources on a frequency domain. As a result, when the channel detection bandwidth is inconsistent with the carrier bandwidth or the data transmission bandwidth of the system, uplink data transmission is performed through a first transmission mode or a second transmission mode, thereby improving utilization efficiency for frequency spectrum resources of an unlicensed frequency spectrum.

Optionally, the first time-frequency resources may be resources on an unlicensed frequency spectrum.

Optionally, the physical channel may be a PUCCH, a PRACH, or a PUSCH.

Optionally, the network device determines the uplink transmission mode according to a type of physical channel to be received.

Optionally, the first data is data which is obtained by the terminal device by performing coding, modulation, and rate-matching on the first transport block, and which matches a size of the first time-frequency resources.

Optionally, the first data is data obtained by the terminal device by performing rate matching on the first transport block during coding and modulation of the first transport block.

Optionally, the scheduling information is one of DCI, RRC signaling, and MAC CE signaling.

Optionally, before the receiving, by the network device, on the first time-frequency resources according to the uplink transmission mode, the first data transmitted by the terminal device (Step S220), the method further includes:

transmitting, by the network device, indication information to the terminal device according to priority of the first transport block, where the indication information is used to indicate the first transmission mode or the second transmission mode.

Specifically, when the indication information indicates the first transmission mode, receiving, by the network device, on the first time-frequency resources according to the first transmission mode, the first data transmitted by the terminal device; or when the indication information indicates the second transmission mode, receiving, by the network device, on the first time-frequency resources according to the second transmission mode, the first data transmitted by the terminal device.

Optionally, the indication information is one of: physical layer signaling, RRC signaling, and MAC CE signaling.

Optionally, as an embodiment, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data.

Specifically, receiving, by the network device, on resources occupied by the first time-frequency resources on the first sub-band, the first sub-data, and receiving, on resources occupied by the first time-frequency resources on the second sub-band, the second sub-data.

Optionally, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the first data being data after the first transport block undergoes rate-matching includes one of the following cases:

the first sub-data is data after the first transport block undergoes rate-matching, and the second sub-data is data after the first transport block undergoes rate-matching;

the first transport block includes two transport blocks, the first sub-data being data after one of the two transport blocks undergoes rate-matching, and the second sub-data being data after other one of the two transport blocks undergoes rate-matching; and the first transport block includes a first CBG and a second CBG, the first sub-data being data after the first CBG undergoes rate-matching, and the second sub-data being data after the second CBG undergoes rate-matching.

Optionally, the first data being data after the first transport block undergoes rate-matching includes:

the first data is data after the first transport block undergoes rate-matching by the terminal device according to a modulation order corresponding to an MCS index, where when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

Optionally, the first MCS configuration set being different from the second MCS configuration set includes:

a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

Optionally, the uplink transmission mode is the first transmission mode, where the first transport block includes at least one of URLLC data and UCI therein.

Optionally, the method 200 further includes:

demodulating, by the network device, the first time-frequency resources, and transmitting feedback information to the terminal device according to a demodulation result, where the feedback information indicates whether data transmitted on the first time-frequency resources is successfully received; or demodulating, by the network device, the first time-frequency resources, and determining, according to a demodulation result, whether to transmit retransmission data corresponding to the first transport block to the terminal device.

Optionally, the feedback information is at least one of ACK, NACK, DTX, and measurement information, where the measurement information includes at least one of CSI on the first carrier, CSI-RS resource identifier on the first carrier, and layer information about the strongest signal on the first carrier.

It should be understood that, for steps in the data transmission method 200, reference may be made to corresponding steps in the data transmission method 100, and for the sake of brevity, details will not be described herein again.

The method embodiments of the present application have been described in detail above with reference to FIG. 1 to FIG. 2, and device embodiments of the present application will be described in detail below with reference to FIG. 3 to FIG. 6. It should be understood that the device embodiments correspond to the method embodiments, for similar description, reference may be made to the method embodiments.

FIG. 3 shows a schematic block diagram of a terminal device 300 according to an embodiment of the present application. As shown in FIG. 3, the terminal device 300 includes:

a communicating unit 320, configured to receive scheduling information transmitted by a network device, where the scheduling information is used to schedule the terminal device to transmit, through first time-frequency resources on a first carrier, a first transport block, wherein the first transport block is a transport block carried by a physical channel; and a processing unit 310, configured to perform rate matching on the first transport block to obtain first data;

the processing unit 310 is further configured to determine an uplink transmission mode, where the uplink transmission mode includes: a first transmission mode and a second transmission mode, where the first transmission mode is that the first data is transmitted through all or part of resources occupied by the first time-frequency resources on a frequency domain, and the second transmission mode is that the first data is transmitted through all resources occupied by the first time-frequency resources on a frequency domain and is not transmitted through part of resources occupied by the first time-frequency resources on a frequency domain; and the processing unit 310 is further configured to perform channel detection on the first carrier, and control the communicating unit 320 to transmit, according to a detection result and the uplink transmission mode, the first data to the network device through the first time-frequency resources.

Optionally, in some embodiments, the processing unit 310 is specifically configured to:

control the communicating unit 320 to receive indication information transmitted by the network device, where the indication information is used to indicate the first transmission mode or the second transmission mode; and determine the uplink transmission mode according to the indication information.

Optionally, in some embodiments, the indication information is one of: physical layer signaling, RRC signaling, and MAC CE signaling.

Optionally, in some embodiments, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the processing unit 310 is specifically configured to:

determine through the channel detection that the first sub-band is available, and control the communicating unit 320 to transmit the first sub-data to the network device through the resources occupied by the first time-frequency resources on the first sub-band; and/or determine through the channel detection that the second sub-band is available, and control the communicating unit 320 to transmit the second sub-data to the network device through the resources occupied by the first time-frequency resources on the second sub-band.

Optionally, in some embodiments, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the performing, by the processing unit 310, rate matching on the first transport block to obtain first data includes one of the following cases:

performing, by the processing unit 310, rate matching on the first transport block to obtain the first sub-data, and performs rate matching on the first transport block to obtain the second sub-data;

the first transport block includes two transport blocks, performing, by the processing unit 310, rate matching on one of the two transport blocks to obtain the first sub-data, and performing rate matching on other one of the two transport blocks to obtain the second sub-data; and the first transport block includes a first code block group CBG and a second CBG, performing, by the processing unit 310, rate matching on the first CBG to obtain the first sub-data, and performing rate matching on the second CBG to obtain the second sub-data.

Optionally, in some embodiments, the uplink transmission mode is the second transmission mode, the processing unit 310 is specifically configured to:

determine through the channel detection that all resources in the first time-frequency resources are available, and control the communicating unit 320 to transmit the first data to the network device through the first time-frequency resource; or determine through the channel detection that at least part of resources in the first time-frequency resources are unavailable, and control the communicating unit 320 to not transmit the first data to the network device through the first time-frequency resources.

Optionally, in some embodiments, the processing unit 310 is specifically configured to:

perform rate matching on the first transport block according to a modulation order corresponding to an MCS index, where when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

Optionally, in some embodiments, the first MCS configuration set being different from the second MCS configuration set includes:

a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

Optionally, in some embodiments, the uplink transmission mode is the first transmission mode, where the first transport block includes at least one of URLLC data and UCI therein.

Optionally, in some embodiments, the scheduling information is one of DCI, RRC signaling, and MAC CE signaling.

It should be understood that the terminal device 300 according to the embodiment of the present application may correspond to the terminal device in the method embodiment of the present application, moreover, the above and other operations and/or functions of the units in the terminal device 300 target at respectively implementing corresponding processes of the terminal device in the method 100 shown in FIG. 1. For the sake of brevity, details will not be described herein again.

Figure 4:
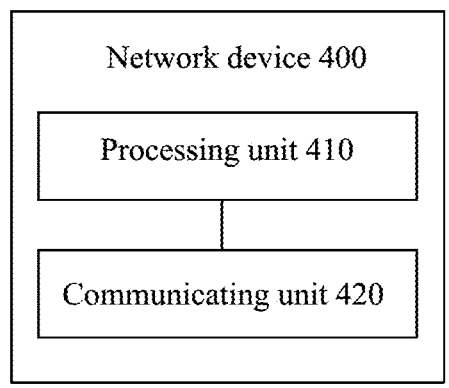
FIG. 4 is a schematic block diagram of a network device according to an embodiment of the present application.

FIG. 4 is a schematic block diagram of a network device according to an embodiment of the present application. The network device 400 in FIG. 4 includes:

a communicating unit 420, configured to transmit scheduling information to a terminal device, where the scheduling information is used to schedule the terminal device to transmit, through first time-frequency resources on a first carrier, a first transport block, wherein the first transport block is a transport block carried by a physical channel;

the communicating unit 420 is further configured to receive, on the first time-frequency resources according to an uplink transmission mode, first data transmitted by the terminal device, where the first data is data after the first transport block undergoes rate-matching, the uplink transmission mode including: a first transmission mode and a second transmission mode, where the first transmission mode is that the first data is received through all or part of resources occupied by the first time-frequency resources on a frequency domain, and the second transmission mode is that the first data is received through all resources occupied by the first time-frequency resources on a frequency domain and is not received through part of resources occupied by the first time-frequency resources on a frequency domain.

Optionally, in some embodiments, before the receiving, by the communicating unit 420, on the first time-frequency resources according to the uplink transmission mode, the first data transmitted by the terminal device, the communicating unit 420 is further configured to transmit indication information to the terminal device, where the indication information is used to indicate the first transmission mode or the second transmission mode;

the communicating unit 420 is specifically configured to:

when the indication information indicates the first transmission mode, receive, on the first time-frequency resources according to the first transmission mode, the first data transmitted by the terminal device; or when the indication information indicates the second transmission mode, receive, on the first time-frequency resources according to the second transmission mode, the first data transmitted by the terminal device.

Optionally, in some embodiments, the indication information is one of: physical layer signaling, RRC signaling, and MAC CE signaling.

Optionally, in some embodiments, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the communicating unit 420 is specifically configured to:

receive, on resources occupied by the first time-frequency resources on the first sub-band, the first sub-data, and receive, on resources occupied by the first time-frequency resources on the second sub-band, the second sub-data.

Optionally, in some embodiments, the uplink transmission mode is the first transmission mode, the first time-frequency resources occupying, on the first carrier, resources in at least two sub-bands, the at least two sub-bands including a first sub-band and a second sub-band, the first data including first sub-data and second sub-data, resources occupied by the first time-frequency resources on the first sub-band are used to transmit the first sub-data, and resources occupied by the first time-frequency resources on the second sub-band are used to transmit the second sub-data, the first data being data after the first transport block undergoes rate-matching includes one of the following cases:

the first sub-data is data after the first transport block undergoes rate-matching, and the second sub-data is data after the first transport block undergoes rate-matching;

the first transport block includes two transport blocks, the first sub-data being data after one of the two transport blocks undergoes rate-matching, and the second sub-data being data after other one of the two transport blocks undergoes rate-matching; and the first transport block includes a first CBG and a second CBG, the first sub-data being data after the first CBG undergoes rate-matching, and the second sub-data being data after the second CBG undergoes rate-matching.

Optionally, in some embodiments, the first data being data after the first transport block undergoes rate-matching includes:

the first data is data after the first transport block undergoes rate-matching by the terminal device according to a modulation order corresponding to an MCS index, where when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

Optionally, in some embodiments, the first MCS configuration set being different from the second MCS configuration set includes:

a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

Optionally, in some embodiments, the uplink transmission mode is the first transmission mode, where the first transport block includes at least one of URLLC data and UCI therein.

Optionally, in some embodiments, the scheduling information is one of DCI, RRC signaling, and MAC CE signaling.

Optionally, in some embodiments, the network device 400 further includes:

a processing unit 410, configured to demodulate the first time-frequency resources, and control the communicating unit to transmit feedback information to the terminal device according to a demodulation result, where the feedback information indicates whether data transmitted on the first time-frequency resources is successfully received.

Specifically, the network device 400 may correspond to the network device described in the above method 200 (for example, may be configured in the network device or is the network device in itself), moreover, the modules or the units in the network device 400 are used to respectively perform actions or processing procedures implemented by the network device in the above method 200. Here, in order to avoid redundancy, details will be omitted herein.

Figure 5:
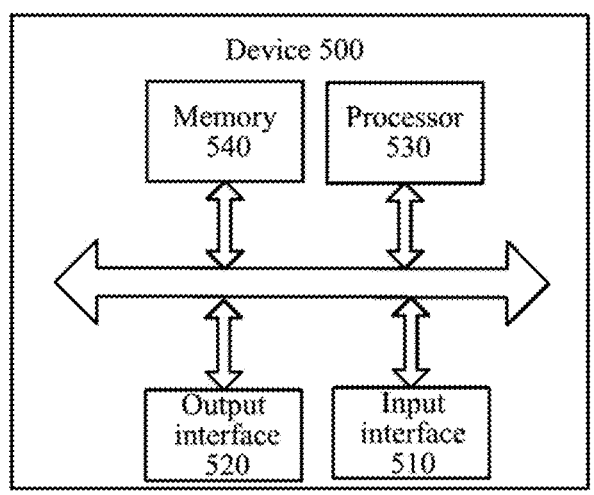
FIG. 5 is a schematic block diagram of a data transmission device according to an embodiment of the present application.

As shown in FIG. 5, a data transmission device 500 is further provided in an embodiment of the present application. The device 500 may be the terminal device 300 of FIG. 3, which can be configured to execute the contents about the terminal device corresponding to the method 100 of FIG. 1. The device 500 includes: an input interface 510, an output interface 520, a processor 530, and a memory 540. The input interface 510, the output interface 520, the processor 530, and the memory 540 can be connected through a bus system. The memory 540 is configured to store programs, instructions or codes. The processor 530 is configured to execute the programs, the instructions or the codes in the memory 540 to control the input interface 510 to receive a signal, control the output interface 520 to transmit a signal, and complete the operations in the foregoing method embodiment.

It should be understood that, in the embodiment of the present application, the processor 530 may be a Central Processing Unit (CPU), and the processor 530 may also be other general-purpose processor, a digital signal processor (DSP), an application specific integrated circuit (ASIC), a field programmable gate array (FPGA), or other programmable logic device, discrete gate or transistor logic device, discrete hardware component, etc. The general-purpose processor may be a microprocessor or the processor may also be any conventional processor, etc.

The memory 540 may include a read only memory and a random access memory, and provides instructions and data to the processor 530. A portion of the memory 540 may also include a non-volatile random access memory. For example, the memory 540 may also be stored with device type information.

During an implementation, contents of the foregoing method may be completed by using an integrated logic circuit of hardware in the processor 530 or an instruction in a software form. The contents of the method disclosed in conjunction with the embodiments of the present application may be directly implemented as completing by a hardware processor, or may be implemented as completing by using a combination of hardware and software modules in the processor. The software module can be located in a storage medium mature in the field, such as, a random access memory, a flash memory, a read only memory, a programmable read only memory or an electrically erasable programmable memory, a register, or the like. The storage medium is located in the memory 540, and the processor 530 reads information in the memory 540, and completes the contents of the foregoing method in conjunction with the hardware thereof. To avoid repetition, details will not be described herein again.

In a specific implementation, the processing unit 310 included in the terminal device 300 of FIG. 3 may be implemented by using the processor 530 of FIG. 5, and the communicating unit 320 included in the terminal device 300 of FIG. 3 can be implemented by using the input interface 510 and the output interface 520 of FIG. 5.

Figure 6:
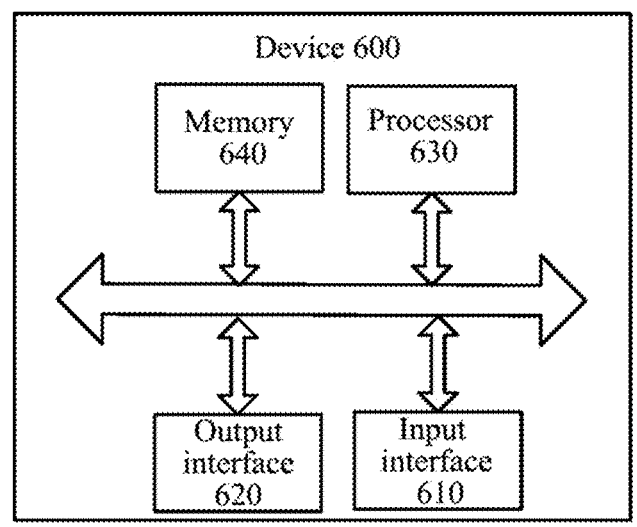
FIG. 6 is a schematic block diagram of a data transmission device according to another embodiment of the present application.

As shown in FIG. 6, a data transmission device 600 is further provided in an embodiment of the present application. The device 600 may be the network device 400 of FIG. 4, which can be configured to execute the contents about the network device corresponding to the method 200 of FIG. 2. The device 600 includes: an input interface 610, an output interface 620, a processor 630, and a memory 640. The input interface 610, the output interface 620, the processor 630, and the memory 640 can be connected through a bus system. The memory 640 is configured to store and include programs, instructions or codes. The processor 630 is configured to execute the programs, the instructions or the codes in the memory 640 to control the input interface 610 to receive a signal, control the output interface 620 to transmit a signal, and complete the operations in the foregoing method embodiment.

It should be understood that, in the embodiment of the present application, the processor 630 may be a Central Processing Unit (CPU), and the processor 630 may also be other general-purpose processor, a digital signal processor (DSP), an application specific integrated circuit (ASIC), a field programmable gate array (FPGA), or other programmable logic device, discrete gate or transistor logic device, discrete hardware component, etc. The general-purpose processor may be a microprocessor or the processor may also be any conventional processor, etc.

The memory 640 may include a read only memory and a random access memory, and provides instructions and data to the processor 630. A portion of the memory 640 may also include a non-volatile random access memory. For example, the memory 640 may also be stored with device type information.

During an implementation, contents of the foregoing method may be completed by using an integrated logic circuit of hardware in the processor 630 or an instruction in a software form. The contents of the method disclosed in conjunction with the embodiments of the present application may be directly implemented as completing by a hardware processor, or may be implemented as completing by using a combination of hardware and software modules in the processor. The software module can be located in a storage medium mature in the field, such as, a random access memory, a flash memory, a read only memory, a programmable read only memory or an electrically erasable programmable memory, a register, or the like. The storage medium is located in the memory 640, and the processor 630 reads information in the memory 640, and completes the contents of the foregoing method in conjunction with the hardware thereof. To avoid repetition, details will not be described herein again.

In a specific implementation, the processing unit 410 included in the network device 400 of FIG. 4 may be implemented by using the processor 630 of FIG. 6, and the communicating unit 420 included in the network device 400 of FIG. 4 can be implemented by using the input interface 610 and the output interface 620 of FIG. 6.

Further provided in an embodiment of the present application is a computer readable storage medium having one or more programs stored thereon, the one or more programs including instructions which, when executed by a portable electronic device including a plurality of applications, enable the portable electronic device to perform the methods in the embodiments shown by FIG. 1 to FIG. 2.

Further provided in an embodiment of the present application is a computer program including instructions. When executed by a computer, the computer program enables the computer to execute corresponding flows of the methods in the embodiments shown in FIG. 1 to FIG. 2.

It may be known to persons of ordinary skill in the art that, the units and the algorithm steps of each example that are described with reference to the embodiments disclosed herein can be implemented by electronic hardware or a combination of computer software and electronic hardware. The situation whether these functions are performed by hardware or software depends on specific applications and design constraints of the technical solutions. Persons skilled in the art may implement the described functions by using different methods for each specific application, but such implementation should not be regarded as going beyond the scope of the present application.

It may be clearly understood by persons skilled in the art that, for the purpose of convenient and brief description, reference may be made to corresponding processes in the foregoing method embodiments for detailed working processes of the foregoing systems, devices, and units, and details will not be described herein again.

In several embodiments provided in the present application, it should be understood that the disclosed systems, devices, and methods may be implemented in other manners. For example, the described device embodiments are merely exemplary. For example, the division of the units is merely a division of logical functions and there may be other divisions during actual implementations. For example, multiple units or components may be combined or integrated into another system, or some features may be omitted or not be performed. In addition, the shown or discussed mutual couplings or direct couplings or communication connections may be implemented through some interfaces. The indirect couplings or communication connections between the devices or the units may be in electronic, mechanical, or other forms.

The units described as separate parts may or may not be physically separate, and parts shown as units may or may not be physical units, that is, may be located in one position, or may be distributed on multiple network units. A part of or all of the units may be selected according to actual needs to achieve the objectives of the schemes in the embodiments.

In addition, functional units in the embodiments of the present application may be integrated into one processing unit, or each of the units may exist alone physically, or two or more units are integrated into one unit.

If implemented in a form of a software functional unit and sold or used as an independent product, the functions may be stored in a computer readable storage medium. Based on such understanding, the technical solutions of the present application essentially, or the part contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in the embodiments of the present application. The foregoing storage medium includes: various mediums that can store program codes, such as, a USB flash disk, a mobile hard disk, a Read-Only Memory (ROM), a Random Access Memory (RAM), a magnetic disk, or an optical disc, etc.

The above descriptions are merely specific embodiments of the present application; however, the protection scope of the present application is not limited thereto. Modification or replacement that may be readily envisaged of by any technical persons knowing the present technical field within the technical scope disclosed in the present application should fall into the protection scope of the present application. Thus, the protection scope of the present application shall be subject to the protection scope of the claims.

What is claimed is:

1. A data transmission method, wherein the method comprises:
    receiving, by a terminal device, scheduling information transmitted by a network device, wherein the scheduling information is used to schedule the terminal device to transmit, through first time-frequency resources on a first carrier, a first transport block, wherein the first transport block is a transport block carried by a physical channel;
    performing, by the terminal device, rate matching on the first transport block to obtain first data;
    determining, by the terminal device, an uplink transmission mode, wherein the uplink transmission mode comprises: a first transmission mode and a second transmission mode, wherein the first transmission mode is that the first data is transmitted through all or part of resources occupied by the first time-frequency resources on a frequency domain, and the second transmission mode is that the first data is transmitted through all resources occupied by the first time-frequency resources on a frequency domain and is not transmitted through part of resources occupied by the first time-frequency resources on a frequency domain; and
    performing, by the terminal device, channel detection on the first carrier, and transmitting, according to a detection result and the uplink transmission mode, the first data to the network device through the first time-frequency resources.

2. The method according to claim 1, wherein the determining, by the terminal device, an uplink transmission mode comprises:
    receiving, by the terminal device, indication information transmitted by the network device, wherein the indication information is used to indicate the first transmission mode or the second transmission mode; and
    determining, by the terminal device, the uplink transmission mode according to the indication information.

3. The method according to claim 2, wherein the indication information is one of: physical layer signaling, radio resource control (RRC) signaling, and media access control control element (MAC CE) signaling.

4. The method according to claim 1, wherein the uplink transmission mode is the first transmission mode, the first time-frequency resources occupying, on the first carrier, resources in at least two sub-bands, the at least two sub-bands comprising a first sub-band and a second sub-band, the first data comprising first sub-data and second sub-data, resources occupied by the first time-frequency resources on the first sub-band are used to transmit the first sub-data, and resources occupied by the first time-frequency resources on the second sub-band are used to transmit the second sub-data,
    the performing, by the terminal device, channel detection on the first carrier, and the transmitting, according to a detection result and the uplink transmission mode, the first data to the network device through the first time-frequency resources comprise:
    determining, by the terminal device, through the channel detection that the first sub-band is available, and transmitting the first sub-data to the network device through the resources occupied by the first time-frequency resources on the first sub-band; and/or
    determining, by the terminal device, through the channel detection that the second sub-band is available, and transmitting the second sub-data to the network device through the resources occupied by the first time-frequency resources on the second sub-band.

5. The method according to claim 1, wherein the uplink transmission mode is the first transmission mode, the first time-frequency resources occupying, on the first carrier, resources in at least two sub-bands, the at least two sub-bands comprising a first sub-band and a second sub-band, the first data comprising first sub-data and second sub-data, resources occupied by the first time-frequency resources on the first sub-band are used to transmit the first sub-data, and resources occupied by the first time-frequency resources on the second sub-band are used to transmit the second sub-data,
    the performing, by the terminal device, rate matching on the first transport block to obtain first data comprises one of the following cases:
    performing, by the terminal device, rate matching on the first transport block to obtain the first sub-data, and performing rate matching on the first transport block to obtain the second sub-data;
    the first transport block comprises two transport blocks, performing, by the terminal device, rate matching on one of the two transport blocks to obtain the first sub-data, and performing rate matching on other one of the two transport blocks to obtain the second sub-data; and
    the first transport block comprises a first code block group (CBG) and a second CBG, performing, by the terminal device, rate matching on the first CBG to obtain the first sub-data, and performing rate matching on the second CBG to obtain the second sub-data.

6. The method according to claim 1, wherein the uplink transmission mode is the second transmission mode,
    the performing, by the terminal device, channel detection on the first carrier, and the transmitting, according to a detection result and the uplink transmission mode, the first data to the network device through the first time-frequency resources comprise:

determining, by the terminal device, through the channel detection that all resources in the first time-frequency resources are available, and transmitting the first data to the network device through the first time-frequency resource; or determining, by the terminal device, through the channel detection that at least part of resources in the first time-frequency resources are unavailable, and not transmitting, by the terminal device, the first data to the network device through the first time-frequency resources.

7. The method according to claim 1, wherein the performing, by the terminal device, rate matching on the first transport block comprises:

performing, by the terminal device, rate matching on the first transport block according to a modulation order corresponding to a modulation and coding scheme (MCS) index, wherein when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

8. The method according to claim 7, wherein the first MCS configuration set being different from the second MCS configuration set comprises:

a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

9. The method according to claim 1, wherein the uplink transmission mode is the first transmission mode, wherein the first transport block comprises at least one of ultra-reliable and low latency communication (URLLC) data and uplink control information (UCI) therein.

10. A data transmission method, wherein the method comprises:

transmitting, by a network device, scheduling information to a terminal device, wherein the scheduling information is used to schedule the terminal device to transmit, through first time-frequency resources on a first carrier, a first transport block, wherein the first transport block is a transport block carried by a physical channel; and receiving, by the network device, on the first time-frequency resources according to an uplink transmission mode, first data transmitted by the terminal device, wherein the first data is data after the first transport block undergoes rate-matching, the uplink transmission mode comprises a first transmission mode and a second transmission mode, wherein the first transmission mode is that the first data is received through all or part of resources occupied by the first time-frequency resources on a frequency domain, and the second transmission mode is that the first data is received through all resources occupied by the first time-frequency resources on a frequency domain and is not received through part of resources occupied by the first time-frequency resources on a frequency domain.

11. The method according to claim 10, before the receiving, by the network device, on the first time-frequency resources according to the uplink transmission mode, the first data transmitted by the terminal device, the method further comprises:

transmitting, by the network device, indication information to the terminal device, wherein the indication information is used to indicate the first transmission mode or the second transmission mode;

the receiving, by the network device, on the first time-frequency resources according to an uplink transmission mode, first data transmitted by the terminal device comprises:

when the indication information indicates the first transmission mode, receiving, by the network device, on the first time-frequency resources according to the first transmission mode, the first data transmitted by the terminal device; or when the indication information indicates the second transmission mode, receiving, by the network device, on the first time-frequency resources according to the second transmission mode, the first data transmitted by the terminal device.

12. The method according to claim 11, wherein the indication information is one of: physical layer signaling, radio resource control (RRC) signaling, and media access control element (MAC CE) signaling.

13. The method according to claim 10, wherein the uplink transmission mode is the first transmission mode, the first time-frequency resources occupying, on the first carrier, resources in at least two sub-bands, the at least two sub-bands comprising a first sub-band and a second sub-band, the first data comprising first sub-data and second sub-data, resources occupied by the first time-frequency resources on the first sub-band are used to transmit the first sub-data, and resources occupied by the first time-frequency resources on the second sub-band are used to transmit the second sub-data, the receiving, by the network device, on the first time-frequency resources according to an uplink transmission mode, first data transmitted by the terminal device comprises:

receiving, by the network device, on resources occupied by the first time-frequency resources on the first sub-band, the first sub-data, and receiving, on resources occupied by the first time-frequency resources on the second sub-band, the second sub-data.

14. The method according to claim 10, wherein the uplink transmission mode is the first transmission mode, the first time-frequency resources occupying, on the first carrier, resources in at least two sub-bands, the at least two sub-bands comprising a first sub-band and a second sub-band, the first data comprising first sub-data and second sub-data, resources occupied by the first time-frequency resources on the first sub-band are used to transmit the first sub-data, and resources occupied by the first time-frequency resources on the second sub-band are used to transmit the second sub-data, the first data being data after the first transport block undergoes rate-matching comprises one of the following cases:

the first sub-data is data after the first transport block undergoes rate-matching, and the second sub-data is data after the first transport block undergoes rate-matching;

the first transport block comprises two transport blocks, the first sub-data being data after one of the two transport blocks undergoes rate-matching, and the second sub-data being data after other one of the two transport blocks undergoes rate-matching; and the first transport block comprises a first code block group (CBG) and a second CBG, the first sub-data being data after the first CBG undergoes rate-matching, and the second sub-data being data after the second CBG undergoes rate-matching.

15. The method according to claim 10, wherein the first data being data after the first transport block undergoes rate-matching comprises:

the first data is data after the first transport block undergoes rate-matching by the terminal device according to a modulation order corresponding to a modulation and coding scheme (MCS) index, wherein when the uplink transmission mode is the first transmission mode, the modulation order is determined according to the MCS index and a first MCS configuration set, and when the uplink transmission mode is the second transmission mode, the modulation order is determined according to the MCS index and a second MCS configuration set, the first MCS configuration set being different from the second MCS configuration set.

16. The method according to claim 15, wherein the first MCS configuration set being different from the second MCS configuration set comprises:

a corresponding modulation order for the MCS index in the first MCS configuration set is greater than or equal to a corresponding modulation order for the MCS index in the second MCS configuration set; and/or a corresponding target code rate for the MCS index in the first MCS configuration set is less than or equal to a corresponding target code rate for the MCS index in the second MCS configuration set.

17. The method according to claim 10, wherein the scheduling information is one of downlink control information (DCI), radio resource control (RRC) signaling, and media access control element (MAC CE) signaling.

18. The method according to claim 10, wherein the method further comprises:

demodulating, by the network device, the first time-frequency resources, and transmitting feedback information to the terminal device according to a demodulation result, wherein the feedback information indicates whether data transmitted on the first time-frequency resources is successfully received.

19. A terminal device, wherein the terminal device comprises a memory, a processor, an input interface, and an output interface, wherein the memory, the processor, the input interface and the output interface are connected through a bus system, the memory is configured to store instructions, and the processor is configured to execute the instructions stored in the memory, for implementing the method according to claim 1.

20. A network device, wherein the network device comprises a memory, a processor, an input interface, and an output interface, wherein the memory, the processor, the input interface and the output interface are connected through a bus system, the memory is configured to store instructions, and the processor is configured to execute the instructions stored in the memory, for implementing the method according to claim 10.

* * * * *